US 10,194,572 B2

(12) United States Patent
Roberge et al.

(10) Patent No.: US 10,194,572 B2
(45) Date of Patent: Feb. 5, 2019

(54) ROW UNIT FOR A DOUBLE-SHOOT DRILL USING TWO STAGGERED DISCS

(71) Applicant: CNH Industrial Canada, Ltd., Saskatoon (CA)

(72) Inventors: Martin J. Roberge, Saskatoon (CA); Joel John Octave Gervais, Saskatoon (CA); Guillaume Cloutier Boily, Martensville (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 72 days.

(21) Appl. No.: 15/148,775

(22) Filed: May 6, 2016

(65) Prior Publication Data

US 2017/0318727 A1    Nov. 9, 2017

(51) Int. Cl.

| | | |
|---|---|---|
| *A01C 5/06* | (2006.01) | |
| *A01B 49/04* | (2006.01) | |
| *A01B 49/06* | (2006.01) | |
| *A01B 49/02* | (2006.01) | |
| *A01C 7/06* | (2006.01) | |
| *A01C 7/08* | (2006.01) | |
| *A01C 7/20* | (2006.01) | |

(52) U.S. Cl.
CPC ............ *A01B 49/06* (2013.01); *A01B 49/027* (2013.01); *A01B 49/04* (2013.01); *A01C 5/062* (2013.01); *A01C 5/064* (2013.01); *A01C 5/068* (2013.01); *A01C 7/06* (2013.01); *A01C 7/08* (2013.01); *A01C 7/203* (2013.01)

(58) Field of Classification Search
CPC ........... A01C 5/062; A01C 5/064; A01C 5/08; A01C 7/06; A01C 7/208; A01B 49/04; A01B 49/06
See application file for complete search history.

(56) References Cited

U.S. PATENT DOCUMENTS

| | | | |
|---|---|---|---|
| 4,275,670 A * | 6/1981 | Dreyer | ..................... A01C 5/06 |
| | | | 111/136 |
| 4,998,488 A | 3/1991 | Hansson | |
| 5,357,884 A | 10/1994 | Bourgault | |
| 5,396,851 A | 3/1995 | Beaujot | |

(Continued)

FOREIGN PATENT DOCUMENTS

EP         2832201         2/2015

OTHER PUBLICATIONS

U.S. Appl. No. 15/148, 838, filed May 6, 2016, Martin J. Roberge.

*Primary Examiner* — Alicia Torres
(74) *Attorney, Agent, or Firm* — Rebecca L. Henkel; Rickard K. DeMille

(57) ABSTRACT

A double-shoot disc-opener row unit for use with agricultural implements includes two discs that form two separate trenches in a planting surface of a field. The mechanical connection between the two discs provides an adjustable longitudinal separation between the discs to prevent an overlap between the discs from a point view perpendicular to the direction of travel of the row unit. The longitudinal separation may reduce the interference of the flow of soil from one disc from interfering with the formations of trenches by the other disc. An adjustable lateral separation between the discs may also provide for a separation between the trenches produced by the different discs.

18 Claims, 7 Drawing Sheets

(56) References Cited

U.S. PATENT DOCUMENTS

| | | | |
|---|---|---|---|
| 5,406,897 A * | 4/1995 | Pingry | A01C 7/042 |
| | | | 111/52 |
| 5,495,814 A | 3/1996 | Primus | |
| 6,032,593 A | 3/2000 | Wending et al. | |
| 6,216,616 B1 | 4/2001 | Bourgault | |
| 7,004,090 B2 | 2/2006 | Swanson | |
| 7,159,523 B2 | 1/2007 | Bourgault et al. | |
| 7,412,933 B2 | 8/2008 | Bourgault et al. | |
| 7,617,784 B2 | 11/2009 | Friggstad | |
| 7,814,847 B2 | 10/2010 | Schilling et al. | |
| 8,215,247 B2 | 7/2012 | Schilling et al. | |
| 8,646,395 B2 | 2/2014 | Schilling et al. | |
| 8,776,701 B2 | 7/2014 | Nikkel et al. | |
| 2004/0149465 A1 * | 8/2004 | Butterfield | A01B 15/16 |
| | | | 172/518 |
| 2010/0096149 A1 * | 4/2010 | Friggstad | A01C 5/064 |
| | | | 172/574 |
| 2013/0074747 A1 * | 3/2013 | Schaffert | A01C 5/04 |
| | | | 111/163 |

\* cited by examiner

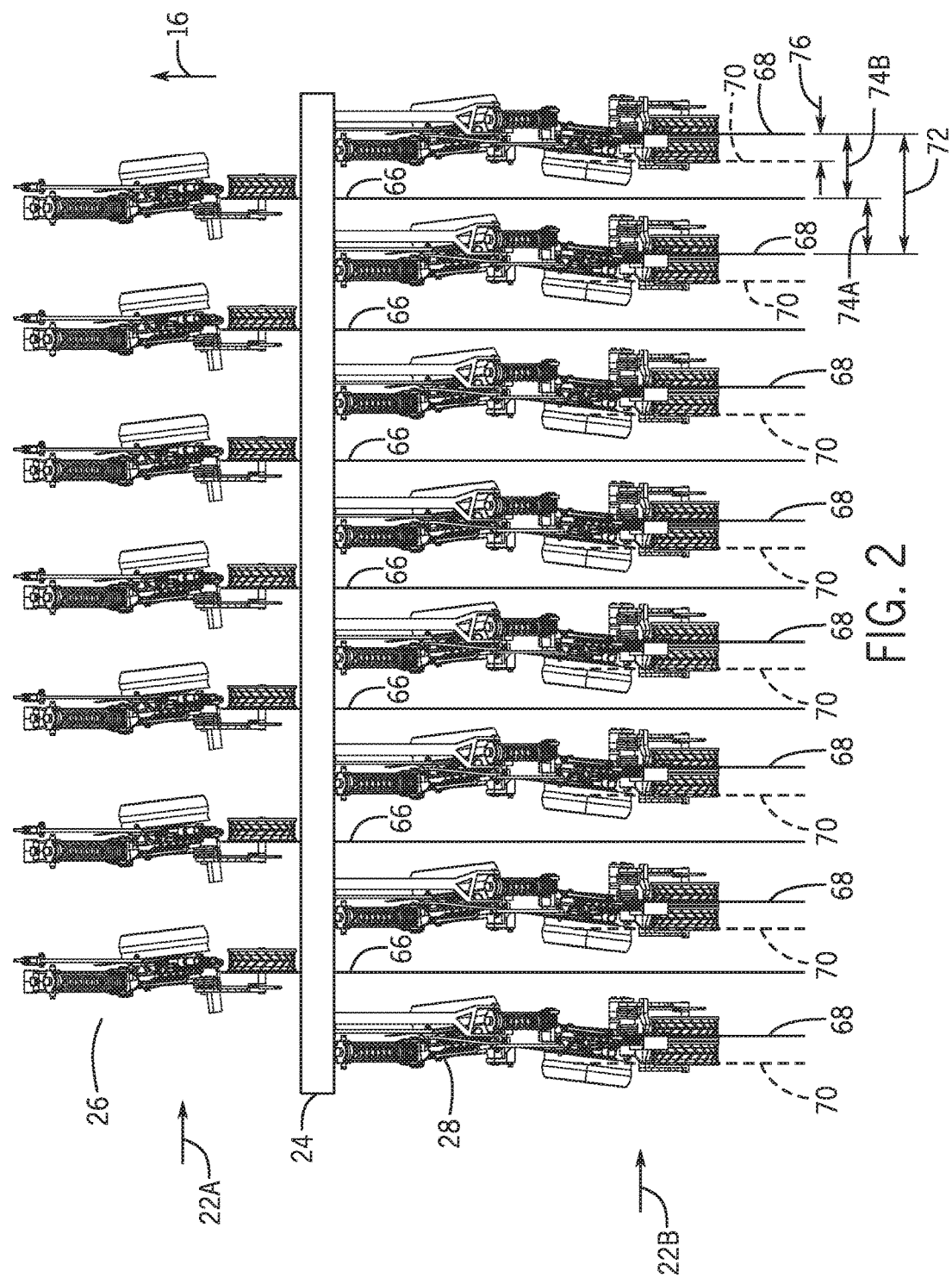

ROW UNIT FOR A DOUBLE-SHOOT DRILL USING TWO STAGGERED DISCS

BACKGROUND

The present disclosure relates generally to agricultural implements, and more specifically to a row unit for a double-shoot disc drill.

Certain agricultural implements, such as disc drills, may be used to open trenches in a soil surface and for placement of an agricultural product, such as seed or fertilizer, in the trenches. A disc drill may have several row units attached to a frame of the disc drill and arranged in a row. This arrangement may form several parallel rows of deposited agricultural product as the disc drill is pulled through a field by a tractor or other prime mover. In some applications, each row unit includes an opener disc configured to excavate a trench into the soil surface, a product chute configured to deposit the agricultural product into the trench, and a packing wheel configured to pack the displaced soil on top of the agricultural product following the deposition of the product.

The distance between the parallel rows of deposited agricultural product may be determined by the separation distance between the row units on the frame. In some situations, it may be useful to reduce the distance between the parallel rows to dimensions smaller than the minimum separation distance between row units (e.g., due to the dimensions of the row units). This may be useful in situations in which an increased crop density may be desired. Reducing the row spacing may also be useful in situations in which fertilizer is deposited into the soil, and the fertilizer is expected to diffuse to the neighboring rows of seeds.

In some disc drills, a second row of staggered row units may be attached to form rows of agricultural product parallel to the rows produced by the first row of row units. For example, each row unit of the second row may be positioned laterally between two adjacent row units of the first row. This second row may form rows of deposited agricultural product when a desired distance between the parallel rows is smaller than the minimum separation distance between disc row units of a single row. Certain disc drills may include a third row of staggered row units to reduce the separation between the parallel rows of deposited product even further. As the number of rows of row units of a disc drill increases, the weight and the dimensions of a disc drill may increase significantly, thereby increasing the complexity of the frame structure of the disc drill and the power sufficient to tow the disc drill.

BRIEF DESCRIPTION

In one embodiment, a double-shoot row unit for use with an agricultural implement, which includes two discs configured to form two separate trenches in a surface of a field and a mechanical linkage assembly connecting the two discs. The mechanical linkage assembly may position the second disc at desired longitudinal and lateral separation distances from the first disc, which may provide a desired separation between the trenches. The longitudinal separation distance may be larger than a sum of the radiuses of the two discs, such that the two discs do not overlap when viewed from a direction parallel to the soil and perpendicular to the direction of travel of the row unit.

In another embodiment, an agricultural implement, such as a disc drill, includes multiple double-shoot disc-openers attached to a frame. Each of the double-shoot disc-openers may form two separate trenches, resulting in an agricultural system that may produce several product rows (e.g. seed rows, fertilizer rows, etc.). The agricultural implement may include single-shoot disc-openers to produce product rows. The agricultural implement may provide flexibility for adjustment of row separation.

In a further embodiment, a double-shoot row unit, which includes a first and a second, frames that supports a first, and a second disc. The unit may also include a mechanical linkage assembly, which includes mechanical connectors to provide a relative positioning between the first, and the second frames, links that allow relative motion between the frames, and independent damping assemblies that prevents excessive motion between the frames from interfering with the operation of the double-shoot row unit. The mechanical linkage assembly may position the second disc at desired longitudinal and lateral separation distances from the first disc, where the longitudinal separation distance may be larger than the sum of the radiuses of the first and the second disc.

DRAWINGS

These and other features, aspects, and advantages of the present disclosure will become better understood when the following detailed description is read with reference to the accompanying drawings in which like characters represent like parts throughout the drawings, wherein:

FIG. 2 is a top view of a portion of the disc drill of FIG. 1, which illustrates rows of seeds and fertilizer deposited by the disc drill, in accordance with an embodiment of the present disclosure;

DETAILED DESCRIPTION

The present disclosure is generally directed to agricultural implements, such as disc drills, capable of deposited agricultural product into soil of a field. Disc drills may form several parallel trenches in the surface of a field as the disc drill is towed in a direction of travel, deposit agricultural product(s) within each trench, and pack displaced soil onto the deposited agricultural product. The disc drill may include several row units, and each may form a respective trench as a disc of the respective row unit displaces soil. Each row unit may also include components (e.g. a product chute) that enable placement of an agricultural product, such as seed or fertilizer, in the respective trench. Moreover, each row unit may include an independent packer wheel that packs the displaced soil onto the deposited agricultural product after deposition of the agricultural product to cover the respective trench formed by the disc of the respective row unit.

The disc drill may have two rows of row units. The row units of each row may be supported by a respective frame member, as discussed in detail below. In some implementations, the row units may be arranged to form staggered rows (e.g., with each row unit of a second row positioned laterally between two adjacent row units of a first row). In these implementations, rows of deposited agricultural product(s) from row units of a first section substantially separate from rows of deposited agricultural product(s) from row units of a second section. Moreover, the disc drill may include a row of double-shoot row units, which may produce two rows of deposited agricultural product per row unit. In some implementations, a disc drill including a row of single-shoot row units and a row of double-shoot row units may be used to provide an increased density of rows of deposited agricultural product by reducing the distance between the parallel rows, as discussed in detail below. Other implementations may include two rows of double-shoot row units to increase density of agricultural product rows even further.

Figure 1:
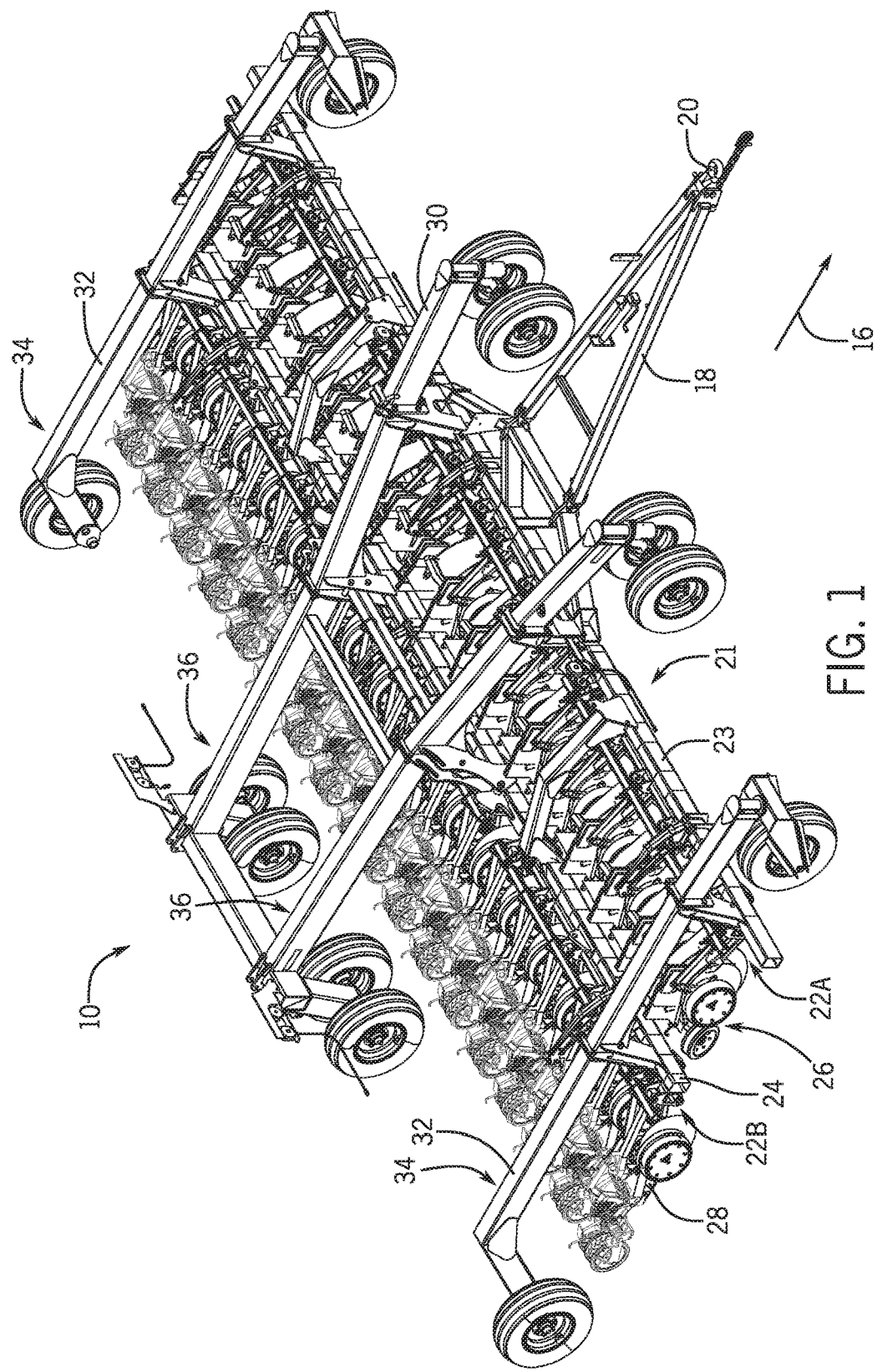
FIG. 1 is a perspective view of a disc drill with two rows of staggered row units, in which the first row includes single-shoot units, and the second row includes double-shoot row units, in accordance with an embodiment of the present disclosure.

Referring now to the drawings, FIG. 1 is a perspective view of a disc drill 10 with two rows of staggered row units, in which the first row includes single-shoot units, and the second row includes double-shoot row units, in accordance with an embodiment of the present disclosure. The disc drill 10 may be towed by a tractor or other prime mover in a direction of travel 16. In the illustrated embodiment, the disc drill 10 includes an A-frame 18 and a hitch assembly 20, which may be coupled to a corresponding hitch assembly of the tractor or other prime mover. The A-frame 18 is coupled to a main frame 21 of the disc drill 10. In addition, the main frame 21 includes a first frame element 23 that supports a first row 22A of row units and a second frame element 24 that supports a second row 22B of row units. In the illustrated embodiment, the first row 22A includes single-shoot row units 26 and the second row 22B includes double-shoot row units 28.

The frame elements 23 and 24 are connected to each other and supported by a central frame section 30 and side frame sections 32 of the main frame 21. Wheels are rotatably coupled to the central frame section 30 and the side frame sections 32 to facilitate movement of the disc drill 10 through the field. Moreover, a rear element 34 of each side frame section 32 and rear elements 36 of the central frame section 30 extend along the direction of travel a sufficient distance to accommodate the double-shoot row units 28. In some implementations, a main frame configured to support two rows of single-shoot row units may be modified through an extension of the rear beams 34 and 36 to accommodate double-shoot row units 28 coupled to the second frame element 24.

It should be understood that, while the disc drill 10 includes 18 double-shoot row units 28 and 18 single-shoot row units 26, arrangements with any number of single-shoot row units and/or double shoot row units may be employed. In some embodiments, the disc drill may include two sections of row units, in which the front section includes double-shoot row units and the rear section includes single-shoot row units. In certain embodiments, the position of a section of single-shoot row units and a section of double-shoot row units may be swappable (e.g. interchangeable) by an operator of the disc drill. Moreover, while the illustrated disc drill 10 has a first row 22A with single-shoot row units and a second row 22B with double-shoot row units, certain disc drills may include a mixture of single-shoot and double-shoot row units in each section. Furthermore, in certain embodiments, the disc drill may include double-shoot row units within the first and second sections.

FIG. 2 illustrates a top view of a portion of the disc drill 10 of FIG. 1, which illustrates rows of seeds and fertilizer deposited by the disc drill 10, in accordance with an embodiment of the present disclosure. In the illustrated embodiment, the first row 22A of row units includes single-shoot row units 26, and the second row 22B of row units includes double-shoot row units 28. As illustrated, the double-shoot row units 28 are coupled to the second frame element 24. As the disc drill 10 is towed in direction of travel 16, it may form seed rows 66 and 68 and fertilizer rows 70. As each single-shoot row unit moves in the direction of travel, a disc of the row unit may displace soil to form a trench, a product chute may deposit seed or fertilizer within the trench, and a packing wheel may pack the soil over the deposited seed or fertilizer to close the trench. Similarly, as each double-shoot row unit moves in the direction of travel, each of the two discs of the row unit may form a respective trench, product chutes may deposit seed or fertilizer within each of the two trenches, and packing wheel(s) may pack the soil over the deposited product(s) to close the trenches. In some arrangements, seed rows 66 may be formed by the single-shoot row units 26, and seed rows 68 and fertilizer rows 70 may be formed by the double-shoot row units 28. In some embodiments, certain double-shoot row units (e.g., all double shoot row units) may be configured to deposit fertilizer into the rows 68 and seed into the rows 70.

As previously described, the positions of the single-shoot row units 26 in the first row 22A are staggered with respect to the positions of the double-shoot row units 28 in the second row 22B. Moreover, the double-shoot row units 28 form rows that are separated from one another. As a result of the arrangement of the first and second rows of row units, the disc-drill 10 may be able to form multiple rows of deposited agricultural product(s) with smaller separation between rows, as compared to a disc-drill with a single row of row units or a disc-drill with two rows of single-shoot row units. While the first row 22A of row units includes single-shoot row units 26, and the second row 22B of row units includes double-shoot row units 28, in certain embodiments other row unit configurations (e.g., a first row of double-shoot row units and a second row of single-shoot row units, a first row of double-shoot row units and a second row of double-shoot row units, a row including a combination of single-shoot units and double shoot units, etc.), as described above, might be employed.

As mentioned above, the disc drill 10 may form three sets of rows: seed rows 66, seed rows 68, and fertilizer rows 70. The separation between adjacent row units within a row, such as the lateral distance between row units 28 in row 22B, may determine the separation between rows of each set, such as a distance 72 between two adjacent rows of the seed rows 68, as illustrated. Placement of row units 26 of the first row 22A in a staggered pattern with respect to the row units 28 of the second row 22B may establish a distance 74A between each seed row 68 and a respective adjacent seed row 66. A complementary distance 74B may also be established. If a symmetric staggering is employed, distances 74A and 74B may be substantially equal to one another and substantially half of the distance 72. Moreover, a distance 76 between each seed row 68 and a respective adjacent fertilizer row 70 may be established based on the lateral offset between the discs of the double-shoot row unit 28.

In some implementations, the distance 76 may be substantially half of distance 74B, which results in a fertilizer row 70 substantially equidistant to the adjacent seed rows 66 and 68. In other implementations, the distance 76 may be less than half of the distance 74B, which results in a fertilizer row 70 closer to the respective seed row 68 than to respective seed row 66. In some applications, the distance 72 may be about 15, 20, or 24 inches. In other applications, the distance 74B may be about 7.5, 10, or 12 inches inches. In such applications, the distance 76 may be any suitable value less than or equal to 10 inches, such as 3.75, 5 or 6 inches if distance 76 is half of the distance 74B. It should be noted that the arrangement provided by disc drill 10, which produces two sets of seed rows and one set of fertilizer rows, may be obtained through different arrangements of products in the row units (e.g., a fertilizer row produced by each single-shoot unit and two seed rows produced by each double-shoot unit).

Figure 3A:
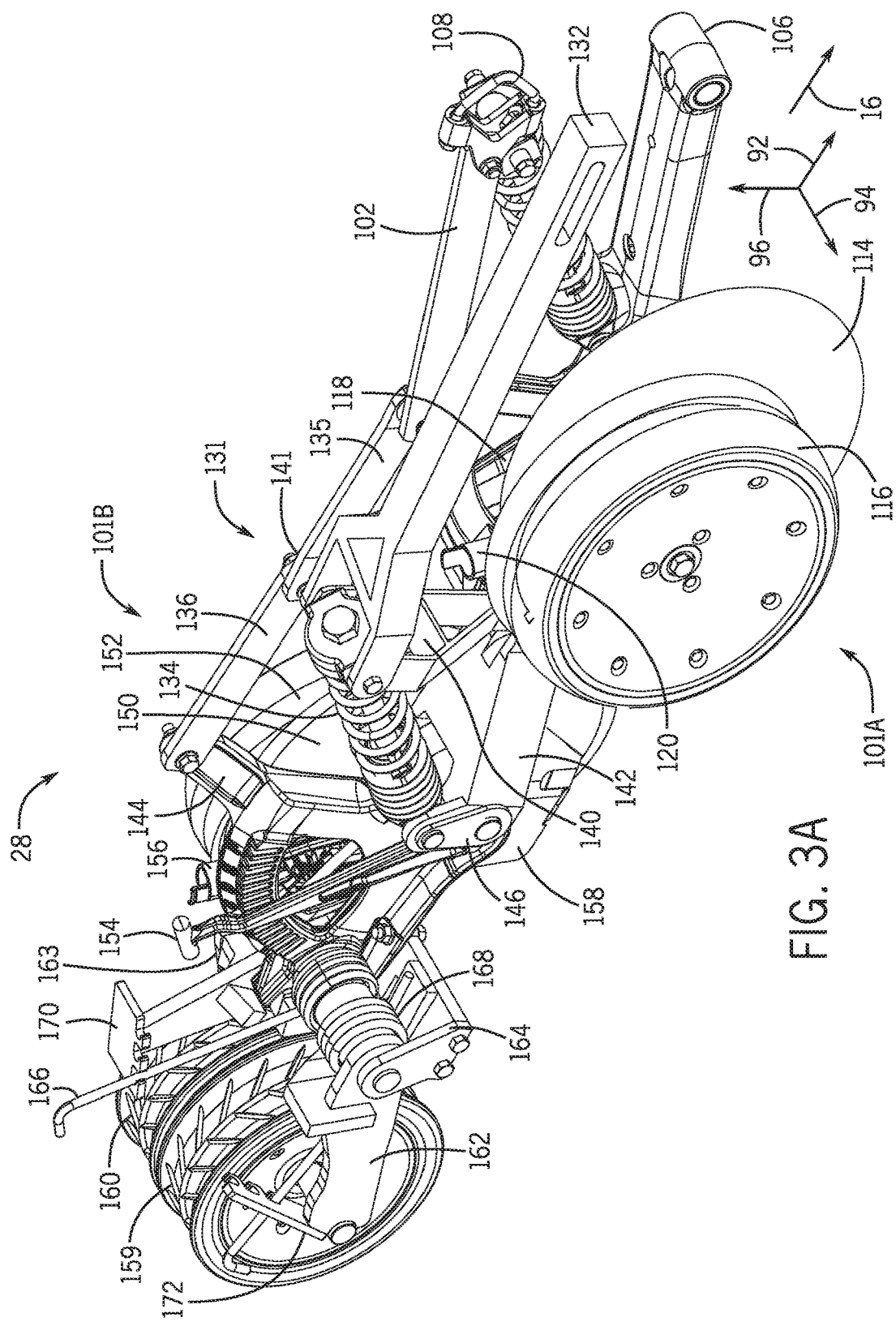
FIG. 3A is a perspective view of a double-shoot row unit which may be used in the disc drill of FIG. 1, in accordance with an embodiment of the present disclosure.
Figure 3B:
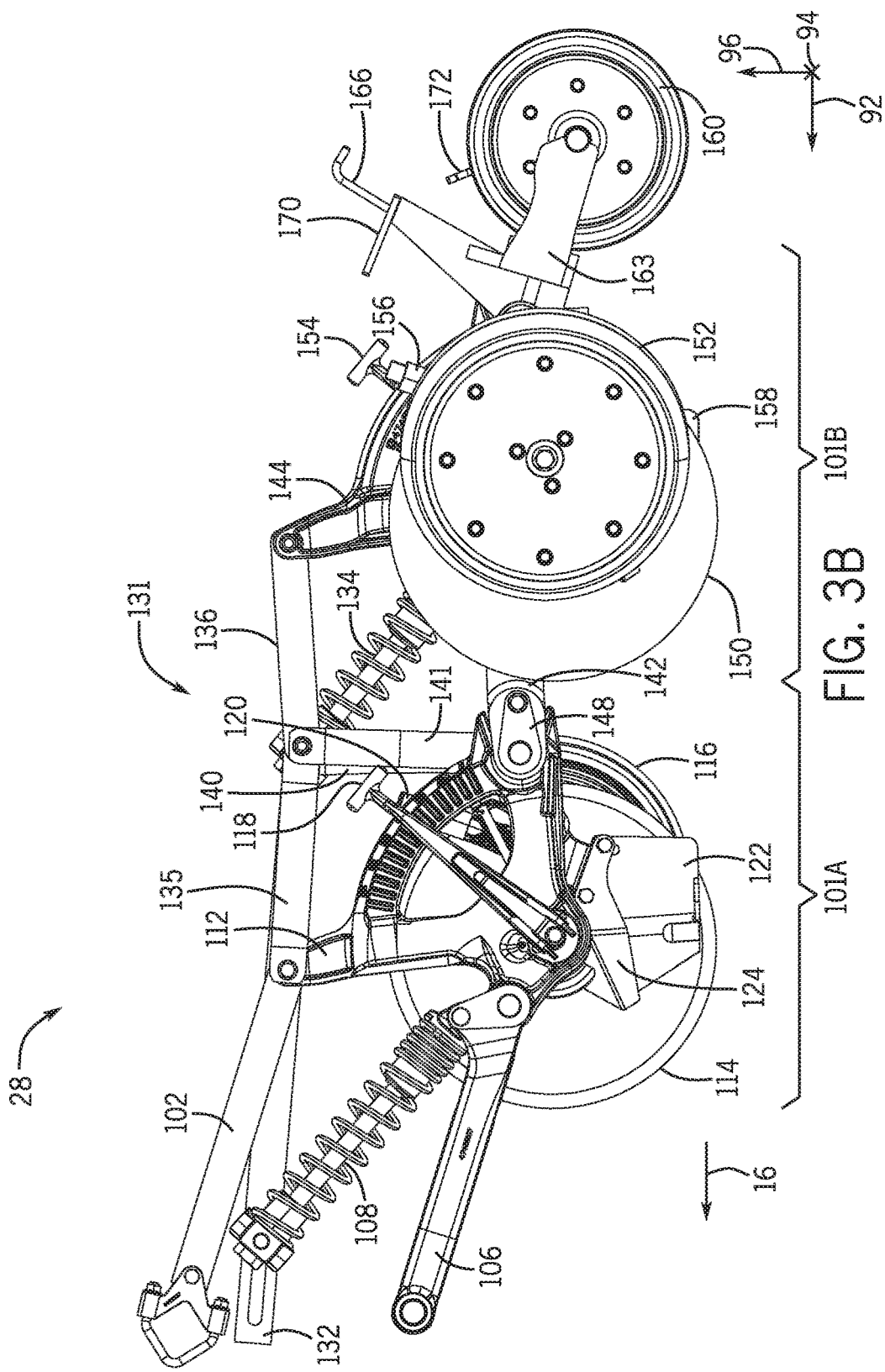
FIG. 3B is a left side view of the double-shoot row unit of FIG. 3A, in accordance with an embodiment of the present disclosure.
Figure 3C:
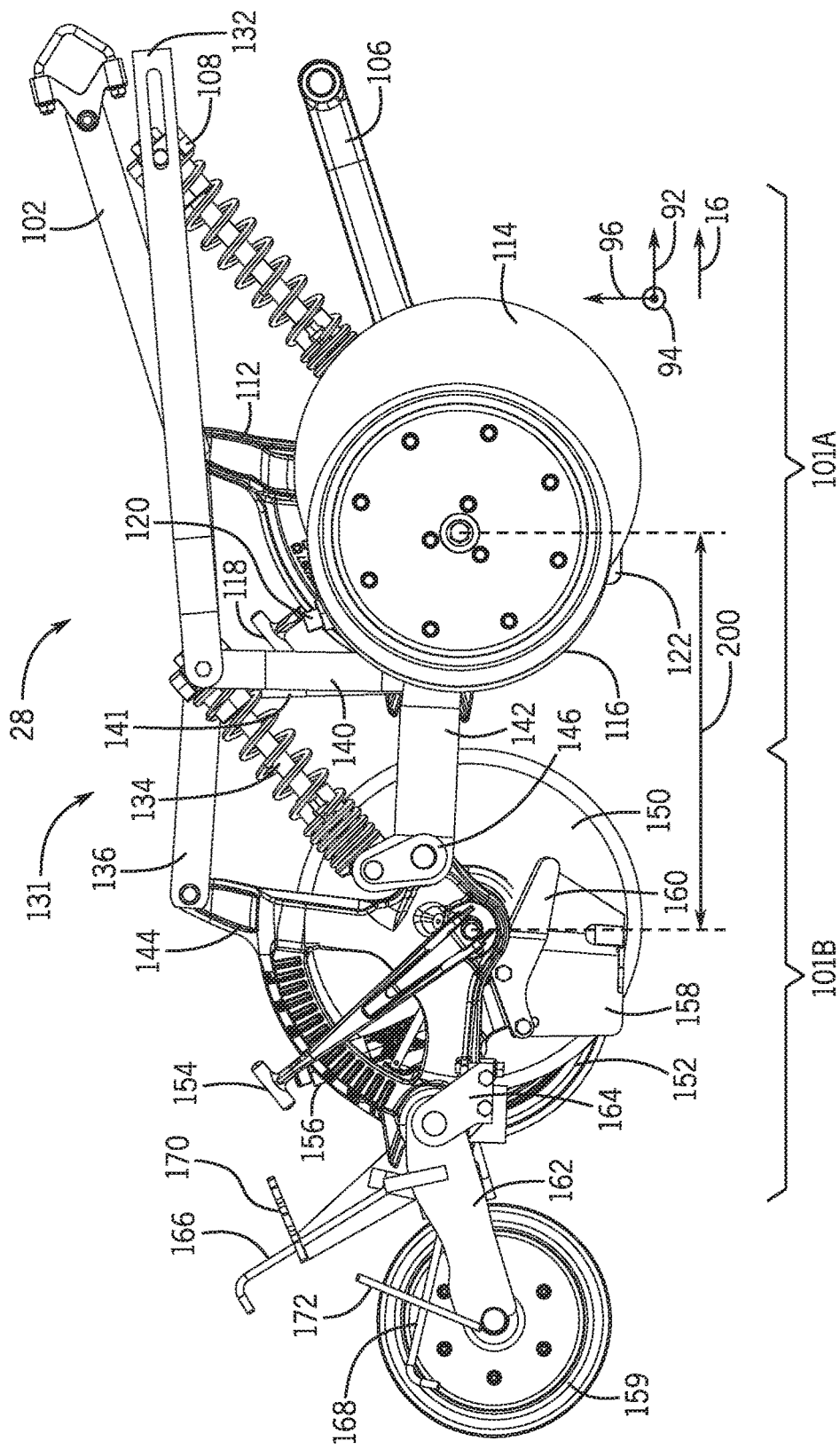
FIG. 3C is a right side view of the double-shoot row unit of FIG. 3A, in accordance with an embodiment of the present disclosure.
Figure 3D:
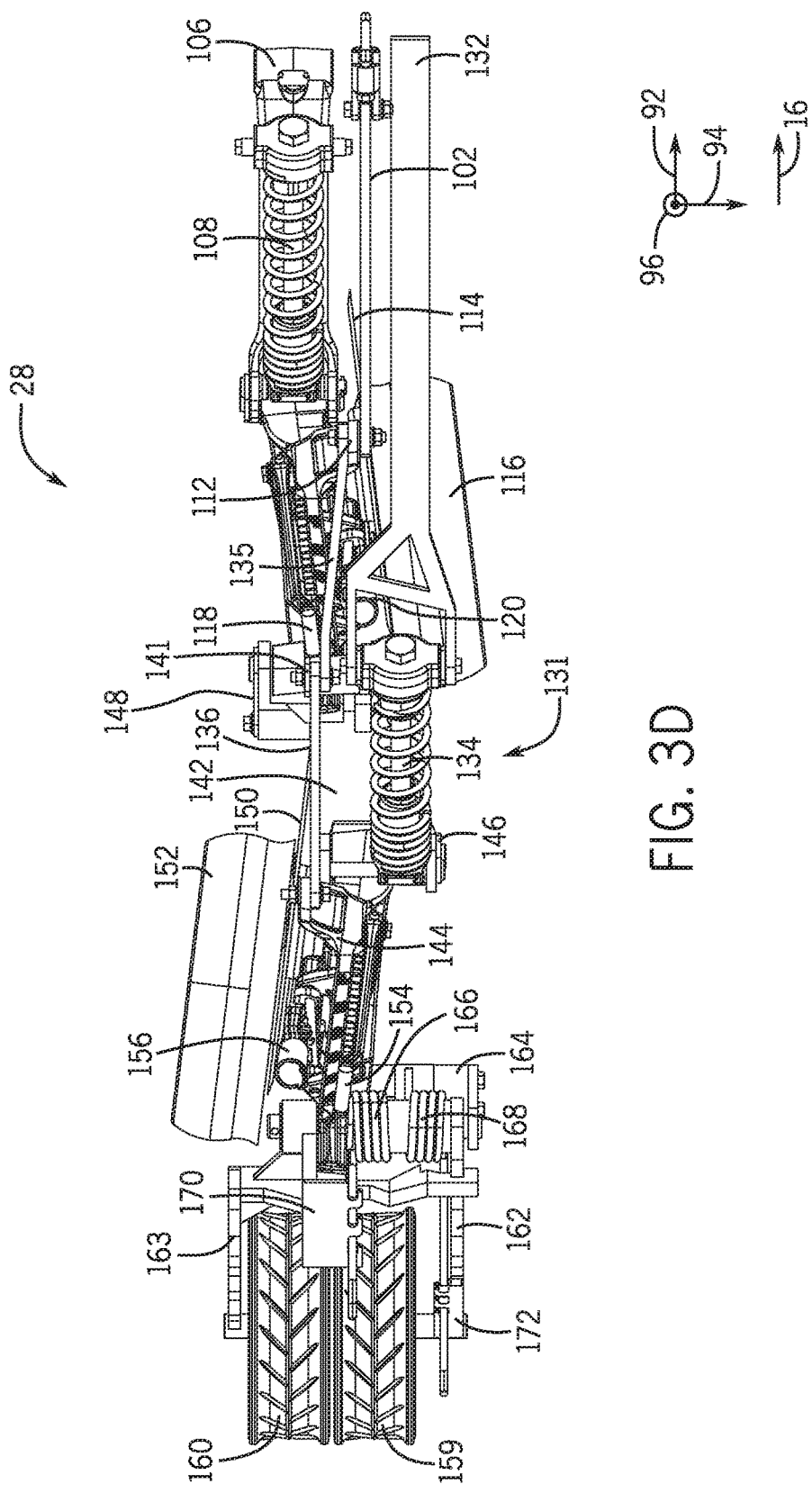
FIG. 3D is a top view of the double-shoot row unit of FIG. 3A, in accordance with an embodiment of the present disclosure.
Figure 3E:
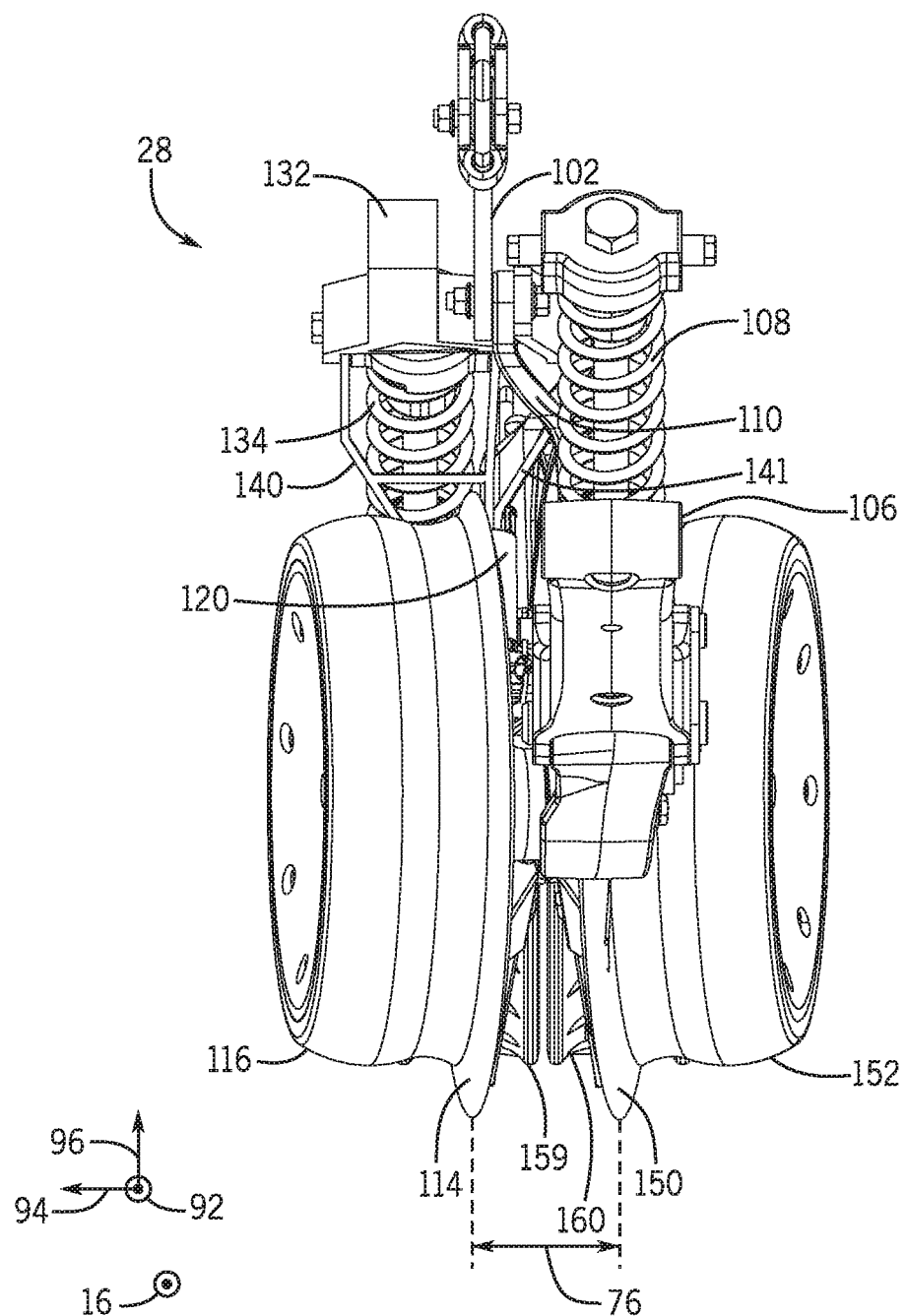
FIG. 3E is a front view of the double-shoot row unit of FIG. 3A, in accordance with an embodiment of the present disclosure.

FIGS. 3A, 3B, 3C, 3D, and 3E are views of a double-shoot row unit 28 that may be used in the disc drill of FIG. 1, in accordance with an embodiment of the present disclosure. In particular, the FIG. 3A is a perspective view of the double-shoot row unit 28, FIG. 3B is a left side view of the double-shoot row unit 28, FIG. 3C is a right side view of the double-shoot row unit 28, FIG. 3D is a top view of the double-shoot row unit 28, and FIG. 3E is a front view of the double-shoot row unit 28. The row unit 28 may be described with reference to a longitudinal axis or direction, 92, a lateral axis or direction 94, and a vertical axis or direction 96. The double-shoot row unit includes two portions, a front disc portion 101A, and a rear disc portion 101B, as illustrated in FIGS. 3B and 3C.

Links 102 and 106 and a damping assembly 108 (e.g., including a spring and a damper) are configured to couple a front frame 112 of the front disc portion 101A to a frame element of the disc drill frame. The damping assembly 108 may be configured to force the front frame 112 against the soil surface. Damping assembly 108 may also be configured to damp upward movement of the front frame 112. A front disc 114 is rotatably coupled to the front frame 112. The front disc 114 is configured to form a trench in the soil. The depth of the trench may be controlled by the position of the front disc 114 relative to a gauge wheel 116 along the vertical axis 96. The vertical position of the gauge wheel may be controlled by a depth regulator handle 118. An agricultural product (e.g., seed or fertilizer) may be disposed within the trench formed by front disc 114 via a front product chute 120. As the front disc 114 displaces soil, a scraper 122, attached to front frame 112 with a trash guard 124, may direct the flow of soil away from the formed trench and remove soil from the front disc 114.

A rear frame 144 of the rear disc region 101B is configured to be coupled to the frame element of the disc drill frame via a link 132 and a damping assembly 134 (e.g., including a spring and a damper). In addition, links 135, 136 and the connector 142 establish a connection between the front frame 112 and the rear frame 144. Connectors 140 and 141 may also provide further stability to the connection between the front frame 112 and the rear frame 144. Connector 140 may link the front frame 112 to the damping assembly 134 and connector 141 may link the front frame 112 to between links 135 and 136. Links 146 and 148 enable the rear frame 114 to rotate relative to the front frame 112. The freedom of rotation provided by links 146 and 148 enables relative motion between the front frame 112 and rear frame 144. The damping assembly 134 may be configured to force the rear frame 144 against the soil surface. Damping assembly 134 may also be configured to damp upward movement of the rear frame 144.

A rear disc 150 is rotatably coupled to the rear frame 144. The rear disc 150 is configured to form a second trench as the row unit 28 moves in the direction of travel 16. The depth of the second trench may be controlled by the position of the rear disc 150 relative to a gauge wheel 152 along the vertical axis 96. The vertical position of the gauge wheel may be controlled by a depth regulator handle 154. An agricultural product (e.g., seed or fertilizer) may be disposed within the trenched formed by rear disc 150 via a rear product chute 156. As the rear disc 150 displaces soil, a scraper 158, attached to rear frame 144 with a trash guard 160, may direct the flow of soil away from the formed trench and remove soil from the rear disc 150.

The mechanical linkage assembly 131 that may include elements 134, 135, 136, 140, 141, 142, 146, and 148 may facilitate freedom of motion between the front frame 112 and the rear frame 144. As an example, if the front disc 114 encounters an obstacle within the field (e.g. a rock), the rotational freedom between frames 112 and 144 enables the front disc 114 and the front frame 112 to move upwardly in the vertical direction without driving the rear frame 144 upwardly. In addition, if the rear disc 150 encounters an obstacle within the field (e.g., a rock), the rotational freedom between the frames 112 and 144 enables the rear disc 150 and the rear frame 144 to move upwardly in the vertical direction without driving the front frame 112 upwardly. The damping assembly 108, which is connected to the frame of the disc drill 10, urges the front frame 112 downwardly and damps an upward movement of disc 114 caused by an encounter with an obstacle independently of rear frame 144. The damping assembly 134, which is directly connected to the frame of the disc drill via link 132, urges the rear frame 144 downwardly and damps movement of the rear frame 144 relative to the front frame 112. Furthermore, the mechanical linkage assembly is configured to reduce rotation of the rear frame 144 relative to the front frame 112 about the vertical axis 96, thereby substantially maintaining orientation of the parallel rows.

Packing wheels 159 and 160 are coupled to the rear frame 144 by two independent linkages 162 and 163. Packing wheel 159 may be substantially laterally aligned with disc 114 to cover a trench formed by disc 114 as the double-shoot row unit moves in direction of travel 16. Similarly, packing wheel 160 may be substantially laterally aligned with disc 150 to cover a trench formed by disc 114. A platform 164 supports a spring 166 that urges the packing wheel 160 toward the soil surface and spring 168 that urges the packing wheel 159 toward the soil surface. The torque applied by the spring 166 may be adjusted by placing an end of the spring 166 in one of a set of slots within element 170. Similarly, the torque applied by the spring 168 may be adjusted by placing an end of spring 168 in one of a set of slots within element 172. Note that the pressure of packing wheels 159 and 160 may be adjusted independently, which may be useful when product chutes 120 and 156 are depositing different agricultural products.

The distance 200 between the center of front disc 114 and the center of the rear disc 150 along the longitudinal axis 92 may be established based on the length of the links 136 and 142 (e.g., the extent of the links 136 and 142 along the longitudinal axis). For example, increasing the length of the links 136 and 142 may increase the distance 200. In the illustrated embodiment, the distance 200 is larger than the sum of the radius of the front disc 114 and the radius of rear disc 150. As a result, the two discs 114 and 150 are spaced apart from one another along the longitudinal axis 92 such that the discs 114 and 150 do not overlap (e.g., a line extending along the lateral axis does not intersect both discs 114 and 150). A longitudinal separation between the discs may be useful to reduce the effect of displaced soil from the front disc 114 on the disposition of agricultural product by the rear disc portion 101B.

The longitudinal separation distance 200 may be measured as the distance between the centers of front disc 114 and rear disc 150 along a measurement direction parallel to the direction of travel 16. For example, the measurement direction may form with the direction of travel an angle of 0°, 1°, 5°, 10°, 15°, 30°, or any other angle smaller than 45°. In some implementations, the longitudinal separation 200 may provide a longitudinal clearance between the discs 114 and 150 of 1 millimeter, i.e., the longitudinal separation 200 may be larger than the sum of the radius of the front disc 114 and the radius of the rear disc 150 by 1 millimeter.

As discussed above, the row unit 28 is configured to produce two parallel rows of deposited agricultural product in the soil having a separation distance 76 along the lateral axis 94. The lateral separation distance 76 is determined based on the lateral separation distance between the front disc 114 and the rear disc 150. In some implementations, the separation distance 76 may be adjustable by removing and replacing connector 142 with a connector having a larger or smaller width (e.g., extend along the lateral axis 94). The lateral separation distance 76 may be measured along a lateral measurement direction parallel to the soil surface and perpendicular to direction of travel 16. For example, the lateral measurement direction may form with the direction of travel an angle of 90°, 89°, 85°, 80°, 75°, 60°, or any other angle larger than 45°. Similarly, the lateral measurement direction may form with the soil surface an angle an angle of 90°, 89°, 85°, 80°, 75°, 60°, or any other angle larger than 45°. In some implementations, the lateral separation distance may be larger than 15 centimeters. In other implementations, lateral separation distances of 7.5 inches, 10 inches, or 12 inches may be employed.

In certain embodiments, the front disc portion 101A and the rear disc portion 101B use multiple common parts. For example, in some implementations, the rear frame 144 may be substantially the same part as the front frame 112 (e.g., within manufacturing tolerances) or substantially a mirror image of front frame 112 (e.g., within manufacturing tolerances). In addition, the front disc 114 may be the same part as the rear disc 150, the gauge wheel 116 may be the same part as the gauge wheel 152, and the depth regulator handle 154 may be the same part as the depth regulator handle 118. Moreover, some of the parts, such as the front frame, the gauge wheel, the disc, and the depth regulator handle, may be used in a single-shoot row unit. As a result, the double-shoot row unit 28 may be produced by employing fewer resources related to design and engineering of new parts. The use of identical or mirror image parts (e.g., within manufacturing tolerances) in front disc portion 101A and rear disc portion 101B may facilitate a simpler assembly process. Note further that, in some implementations of the double-shoot row units, a single packer wheel may be used instead packer wheels 159 and 160. In such implementations, the packer wheel may be sufficiently wide to pack soil onto agricultural produce deposited by both portions of the row unit.

While the illustrated agricultural implement is a disc drill that employs double-shoot and single-shoot row units, other agricultural implements may be employed in alternative embodiments. For example, certain agricultural implements may employ knife openers (e.g., double-shoot knife openers, single-shoot knife openers, etc.) or other suitable row units to establish the seed and fertilizer rows described above.

While only certain features have been illustrated and described herein, many modifications and changes will occur to those skilled in the art. It is, therefore, to be understood that the appended claims are intended to cover all such modifications and changes as fall within the true spirit of the disclosure. Furthermore, it should be understood that any of the features illustrated and described herein with respect to FIGS. 1-3 might be combined in any suitable manner.

The invention claimed is:

1. A double-shoot row unit for an agricultural implement, comprising:
a first disc configured to form a first trench in a soil surface of a field;
a first frame that supports the first disc, wherein the first disc is rotatably coupled to the first frame by a first pivot joint, and the first frame is configured to couple to a main frame of the agricultural implement through a mechanic link;
a second disc configured to form a second trench in the soil surface of the field;
a second frame that supports the second disc, wherein the second disc is rotatably coupled to the second frame by a second pivot joint; and
mechanical linkage assembly connecting the first and second frames to one another, wherein the second frame is configured to couple to the main frame of the agricultural implement through the mechanical linkage assembly and the mechanic link, the mechanical linkage assembly comprises a mechanical connector having a first end rotatably coupled to the first frame and a second end rotatably coupled to the second frame, the mechanical linkage assembly positions the second disc at a longitudinal separation distance from the first disc and positions the second disc at a lateral separation distance from the first disc, and the longitudinal separation distance is greater than the sum of a radius of the first disc and a radius of the second disc.

2. The double-shoot row unit of claim 1, wherein the longitudinal separation distance is measured along a direction substantially parallel to a direction of travel and is 1 millimeter greater than the sum of the radius of the first disc and the radius of the second disc.

3. The double-shoot row unit of claim 1, wherein the lateral separation distance is measured along a direction substantially perpendicular to a direction of travel and is greater than or equal to 15 centimeters.

4. The double-shoot row unit of claim 1, wherein at least one element of the mechanical linkage assembly is interchangeable to adjust the lateral separation distance.

5. The double-shoot row unit of claim 1, wherein the mechanical linkage assembly comprises a damping assembly.

6. The double-shoot row unit of claim 1, wherein a structure of the first frame is substantially the same as a structure of the second frame.

7. The double-shoot row unit of claim 1, comprising a first packing wheel substantially laterally aligned with the first disc and a second packing wheel substantially laterally aligned with the second disc, wherein the first and second packing wheels are coupled to the second frame.

8. The double-shoot row unit of claim 1, comprising a first product chute and a first scraper each coupled to the first frame, and a second product chute and a second scraper each coupled to the second frame.

9. An agricultural implement, comprising:
a structural frame;
a plurality of double-shoot row units attached to the structural frame, each double-shoot row unit of the plurality of double-shoot row units comprising:
a mechanical link;
a first disc configured to form a first trench in a soil surface of a field;
a first disc frame that supports the first disc, wherein the first disc is rotatably coupled to the first frame by a first pivot joint, and wherein the first disc frame is coupled to the structural frame through the mechanical link;
a second disc configured to form a second trench in the soil surface of the field;
a second disc frame that supports the second disc, wherein the second disc is rotatably coupled to the second disc frame by a second pivot joint; and
a mechanical linkage assembly connecting the first and second disc frames to one another, wherein the second frame is configured to couple to the structural frame of the agricultural implement through the mechanical linkage assembly and the mechanic link, the mechanical linkage comprises a mechanical connector having a first end rotatably coupled to the first frame and a second end rotatably coupled to the second frame, the mechanical linkage assembly positions the second disc at a longitudinal separation distance from the first disc and positions the second disc at a lateral separation distance from the first disc and the longitudinal separation distance is greater than the sum of a radius of the first disc and a radius of the second disc.

10. The agricultural implement of claim 9, wherein the longitudinal separation distance is 1 millimeter greater than the sum of the radius of the first and the radius of the second disc, and the lateral separation distance is greater or equal to 15 centimeters.

11. The agricultural implement of claim 9, wherein each double-shoot row unit of the plurality of double-shoot row units comprises a first product chute configured to deposit a first product in the first trench and a second product chute configured to deposit a second product in the second trench.

12. The agricultural implement of claim 11, comprising a plurality of single-shoot row units, each comprising:
a third disc configured to form a third trench in the soil surface of the field; and
a third product chute configured to deposit a third product in the third trench;
wherein at least one single-shoot row unit of the plurality of single-shoot row units is positioned to establish the third trench at a laterally offset position from the first and the second trenches.

13. The agricultural implement of claim 12, wherein the first, second, and third products comprise seed, fertilizer, or any combination thereof.

14. A double-shoot row unit for an agricultural implement, comprising:
a first disc configured to form a first trench in a soil surface of a field;
a second disc configured to form a second trench in the soil surface of the field;
a first frame that supports the first disc, wherein the first disc is rotatably coupled to the first frame by a first pivot joint and the first frame is configured to couple to a main frame of the agricultural implement through a first mechanic link;
a first damping assembly coupled to the first frame;
a second frame that supports the second disc, wherein the second disc is rotatably coupled to the second frame by a second pivot joint; and
a first mechanical linkage assembly that connects the first frame to the second frame, wherein the first mechanical linkage assembly comprises:
a mechanical connector configured to longitudinally separate the first and the second frames to establish a longitudinal separation distance between the first disc and the second disc, wherein the mechanical connector comprises a first end rotatably coupled to the first frame and a second end rotatably coupled to the second frame; and
a second damping assembly coupled to the second frame;
wherein the second frame is configured to couple to the main frame of the agricultural implement through the mechanical linkage assembly and the first mechanic link, and the longitudinal separation distance is greater than the sum of a radius of the first disc and a radius of the second disc.

15. The double-shoot row unit of claim 14, comprising a first packing wheel coupled to the second frame and substantially laterally aligned with the first disc, and a second packing wheel coupled to the second frame and substantially laterally aligned with the second disc.

16. The double-shoot row unit of claim 15, comprising a first spring configured to urge the first packing wheel toward the soil surface and a second spring configured to urge the second packing wheel toward the soil surface, wherein a torque of the first spring is adjustable independently from a torque of the second torque spring.

17. The double-shoot row unit of claim 14, comprising a first product chute coupled to the first frame and configured to deposit a first product in the first trench, and a second product chute coupled to the second frame and configured to deposit a second product in the second trench.

18. The double-shoot row unit of claim 14, comprising a first gauge wheel positioned adjacent to the first disc and configured to control a depth of the first trench, and a second gauge wheel positioned adjacent to the second disc and configured to control a depth of the second trench.

* * * * *